United States Patent [19]

Mohon

[11] 4,077,721

[45] Mar. 7, 1978

[54] APPARATUS FOR MEASURING HOLOGRAPHIC LENS ABERRATION PARAMETERS

[75] Inventor: Windell N. Mohon, Winter Park, Fla.

[73] Assignee: The United States of America as represented by the Secretary of the Navy, Washington, D.C.

[21] Appl. No.: 715,740

[22] Filed: Aug. 19, 1976

[51] Int. Cl.² .............................................. G01B 9/00
[52] U.S. Cl. .................................. 356/124; 250/550; 356/111
[58] Field of Search ................. 356/124, 127, 79, 111; 250/550

[56] References Cited

U.S. PATENT DOCUMENTS

| | | | |
|---|---|---|---|
| 2,042,565 | 6/1936 | Tillyer | 356/127 |
| 3,790,280 | 2/1974 | Heinz et al. | 350/162 SF |
| 3,832,066 | 8/1974 | Cornsweet | 356/127 |
| 3,880,525 | 4/1975 | Johnson | 356/127 |
| 3,938,892 | 2/1976 | Klingman | 356/124 |
| 3,954,337 | 5/1976 | Ragland | 356/111 |
| 4,009,965 | 3/1977 | Pryor | 356/111 |

*Primary Examiner*—John K. Corbin
*Assistant Examiner*—R. A. Rosenberger
*Attorney, Agent, or Firm*—Richard S. Sciascia; Don D. Doty

[57] ABSTRACT

An instrument for measuring various and sundry parameters that are analogous to the aberrations that may exist in holographic lenses and other energy diffraction apparatus is disclosed as containing: a laser energy source; a pair of masks for controlling precisely the path of the light from said laser energy source, so that it may be used as a reference parameter; a rotatable mounting table for holding the holographic lens being tested in an appropriate position in the path of said reference laser light path; a microscope positioned to receive predetermined laser light rays that have been diffracted by the holographic lens being tested; indicia to measure the X, Y and Z axes distances between that point on the holographic lens being tested where the aforesaid laser light path passes therethrough and a given point position on or with respect to said microscope; and a support bench upon which all of the aforesaid elements may be mounted, so that their respective relative positions may be controlled in such manner that they form a unique geometrical configuration and combination.

20 Claims, 6 Drawing Figures

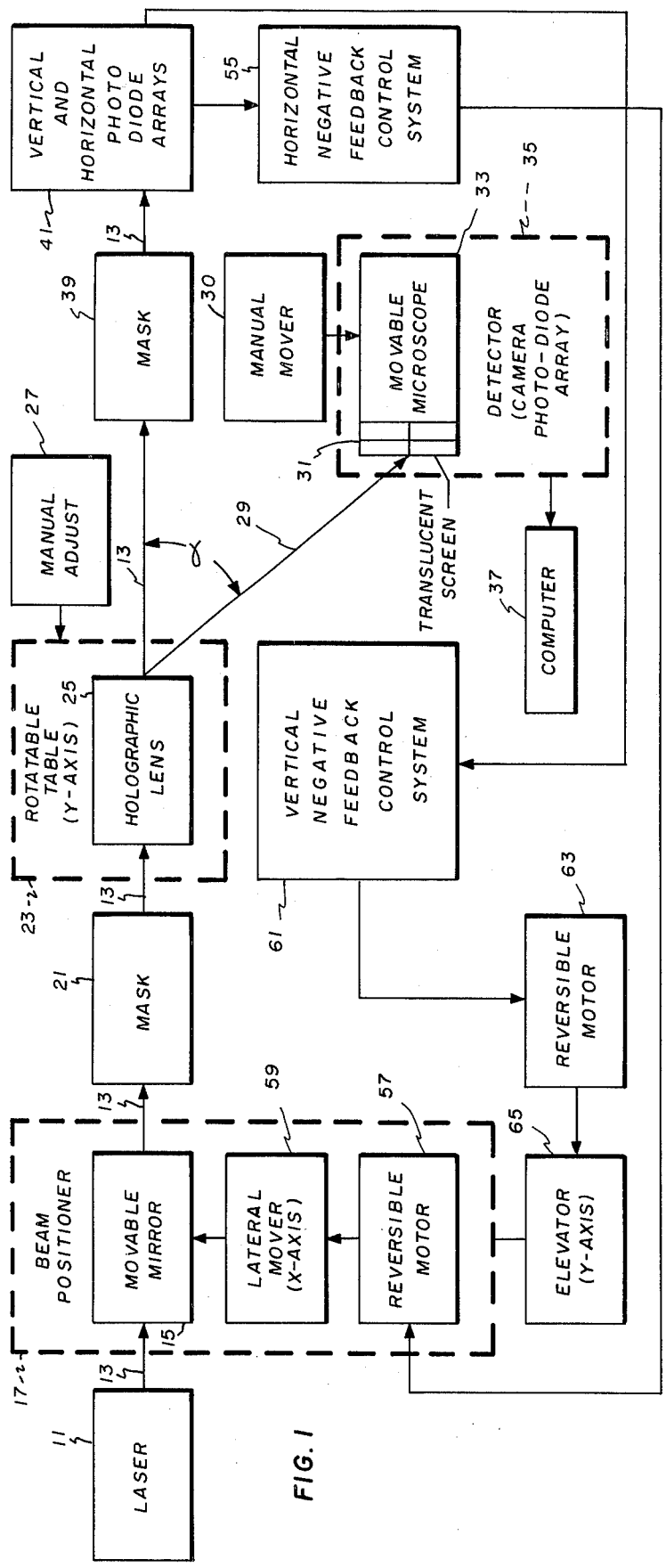
FIG. 1
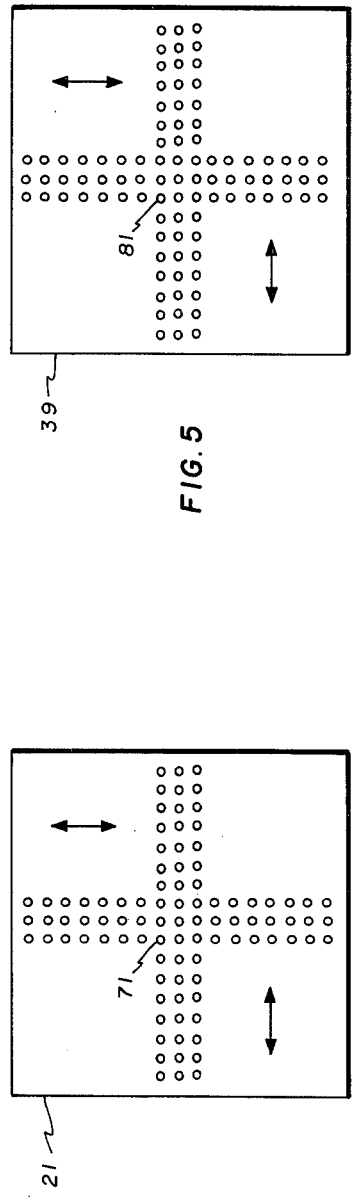
FIG. 5
FIG. 4

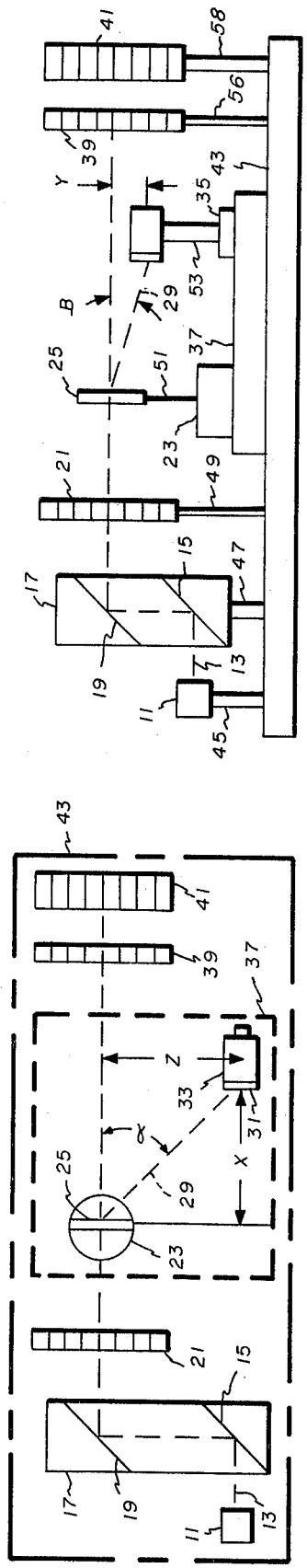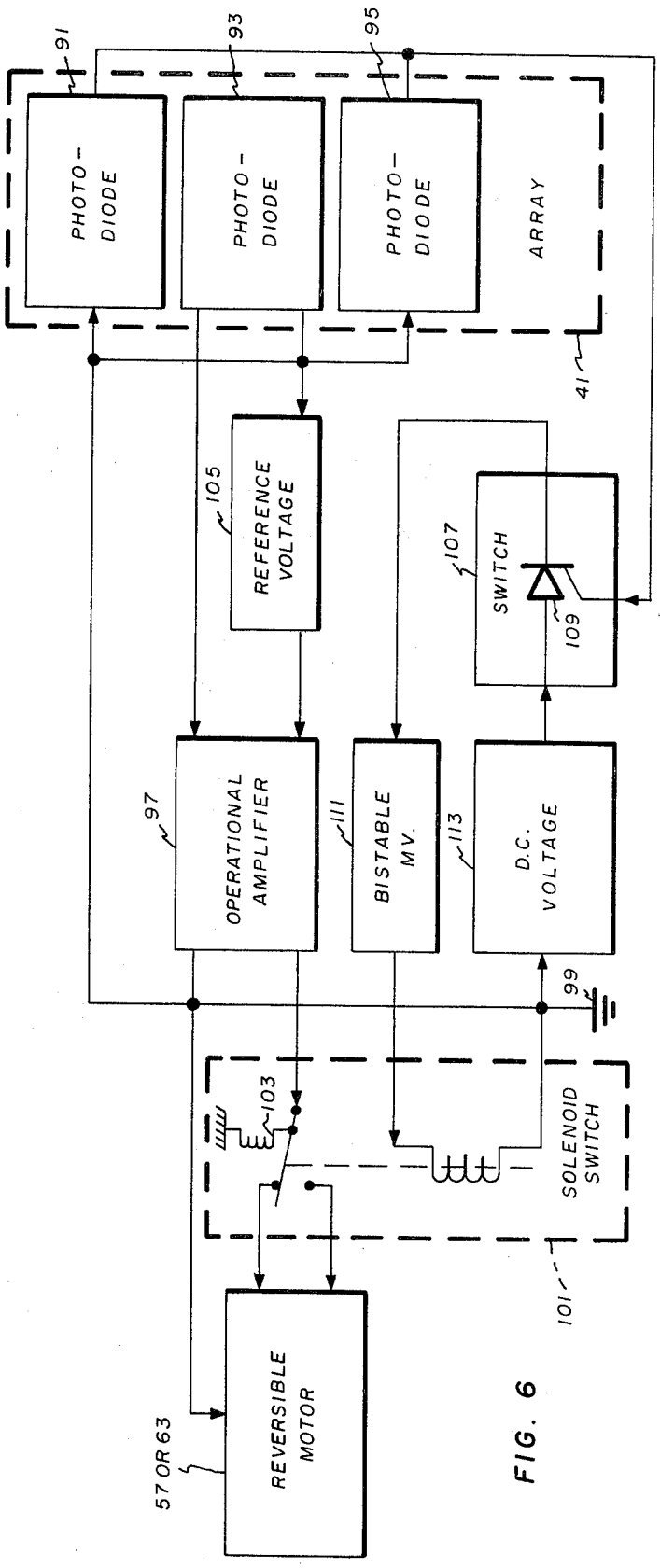

APPARATUS FOR MEASURING HOLOGRAPHIC LENS ABERRATION PARAMETERS

FIELD OF THE INVENTION

In general, the present invention relates to lens aberration measuring instrumentation and, in particular, is an instrument for detecting and measuring the parameters that are analogous to optical aberrations in holographic lenses.

DESCRIPTION OF THE PRIOR ART

Heretofore, various and sundry apparatus has been employed for the purpose of measuring the aberrations in glass and plastic refractive lenses. However, because holographic lenses are relatively new and are diffractive lenses rather than refractive lenses, as far as is known, equipment has not, to date, been developed for measuring optical aberrations inherently existing therein. Of course, the equipment used for measuring the aberrations in glass refractive lenses cannot be used to measure the aberrations in holographic lenses because: (1) a large amount of movement - say 8 × 10 inches - is required of read out beams; (2) a holographic lens must be rotatable through large angles during measurement — say, up to 180°; and (3) the read out direction of holographic lenses is not on-axis and may be off-axis by a large angle — say, up to 170°. Hence, an entirely new approach to the problem of measuring aberrations in holographic lenses was required, and the subject invention was the result which solved it.

SUMMARY OF THE INVENTION

The instant invention comprises a plurality of optically interrelated and interactive elements which are mounted on a predetermined platform with fixed and/or adjustable relative dimensions therebetween, the values of which will be presented subsequently.

Perhaps, at this time, it would be of notable significance that each of the aforesaid interactive elements are well known and conventional, and, therefore, it is their unique optical and structural interconnections and interactions which effect the subject invention and cause it to produce the results stated below.

Included within the subject invention is a laser that is directed in such manner that the light beam thereof is reflected by one or more mirrors of a beam positioner to and through a first mask to the holographic lens being aberration calibrated. At said holographic lens, the aforesaid laser beam is diffracted in accordance with the diffraction pattern incorporated in the holographic lens, from which said laser beam travels to a movable screened microscope and to and/or to and through a second mask to a vertical and horizontal array of light-sensitive photo diodes. The latter constitute the sensors of horizontal and vertical negative feedback control systems which respectively adjust the aforementioned beam positioner (and movable mirror or mirrors mounted thereon) about the vertical and horizontal axes thereof, thereby providing the automatic positioning thereof in such manner that the laser beam is centered on the center or other photo diode and, thus, on a predetermined place on the holographic lens being tested for aberrations. Of course, all of the above mentioned devices are mounted on a suitable base, platform, or table (or tables) as necessary for them to perform their respective intended functions and to effect a new and unique combination thereof.

It is, therefore, an object of this invention to provide a useful and unique method and means for measuring the various optical parameters which are analogous to the aberrations of holographic lenses and other energy diffraction devices.

Another object of this invention is to provide a method and means for moving a light or other radiant energy beam over an entire holographic lens.

Still another object of this invention is to project collimated rays of light or other radiant energy over a large aperture holographic lens — say, for example, one having an aperture of 8 × 10 inches.

A further object of this invention is to provide a new and unique instrument for determining spherical, coma, astigmatism, distortion, and field curvature type aberrations in a diffractive lins-like element, such as, for example, in a holograhic lens, regardless of the type of radiant energy intended to be diffracted thereby.

Another object of this invention is to provide a method and means for testing diffractive type lenses that is economically constructed, operated, and maintained as a consequence of no large (say, 12 inch) light or other radiant energy collimator being incorporated therein.

Other objects and many of the attendant advantages of this invention will be readily appreciated as the same becomes better understood by reference to the following detailed description when considered in connection with the accompanying drawings wherein:

BRIEF DESCRIPTION OF THE DRAWING

FIG. 1 is a block diagram of the apparatus constituting the subject invention for measuring holographic lens aberration analogs;

FIGS. 2 and 3 are schematic top and side elevational views of the optical apparatus portions of the invention of FIG. 1, respectively;

FIGS. 4 and 5 are respective schematic representations of a pair of masks that are incorporated in the apparatus depicted in FIGS. 1, 2, and 3;

FIG. 6 is a combination block and schematic diagram of a negative feedback control system which may be used as the horizontal and vertical negative feedback control systems of FIG. 1.

DESCRIPTION OF THE PREFERRED EMBODIMENTS

Referring now to FIGS. 1, 2, and 3, wherein like parts have like reference numerals, the subject holographic lens testing apparatus is shown as including a laser energy source 11, which, in fact, produces a collimated monochromatic light beam 13, the operational frequency of which falls within the visible spectrum. Said laser 11 may be fixed at some necessary or desired position, or it may be movable in space as required by operational circumstances.

Although, in this particular preferred embodiment of the invention, a laser is used to produce light beam 13, it should be understood that a maser or any other suitable means may be used as an energy source, as long as the type of energy produced thereby is appropriate for the holographic lens or other energy diffraction means being tested. Hence, as just implied above, any other radiant energy may be employed as beam 13, if operational circumstances so warrant, without violating the scope or spirit of this invention. Obviously, it would be well within the purview of the artisan having the benefit of the teachings presented herewith to select whatever energy source would be optimum for any given operational circumstances.

Nevertheless, in the preferred embodiment of the invention being defined now, beam 13 is a collimated, monochromatic light beam produced by the aforementioned laser 11.

Laser beam 13, as may readily be seen, is projected toward a movable mirror 15 mounted on a beam positioner 17, which, in turnis capable of being rotated about and moved up and down along its Y axis and along its laterial X or Z axes, either manually or by suitable control systems, as desired.

As is evident, beam positioner 17 of FIG. 1 contains only one mirror, while beam positioners 17 of FIGS. 2 and 3 are of the periscope type which contains two (or more) mirrors. Either type of beam positioner may, of course, be used in either of the positions shown respectively therein in the instant invention, since the selection thereof would only be a matter of design choice and contingent on laser disposition. Thus, beam positioner 17 of FIGS. 2 and 3 is depicted as having a second mirror 19 mounted thereon.

As also would be evident to one skilled in the art, mirrors 15 and 19 may be replaced with appropriate prisms, or other reflectors, as required for the various energy means selected for laser 11.

After reflection from movable mirror 15 (or 19, as the case may be), beam 13 is passed through a first plate mask 21 having a predetermined plurality of holes disposed in a predetermined number of rows and columns therethrough, as best disclosed in FIG. 4, which will be discussed more fully subsequently.

Located on a table 23 that is adjustably rotatable about its Y axis is a holographic lens 25. Of course, said holograhic lens 25 is mounted on table 23 in such manner that it is positioned in the path of that portion of laser beam 13 that passes through the centrally located (or other) holes of mask 21. Although table 23 is preferably rotated and properly positioned by a manual adjustment 27, is should be understood that it, too, may be automatically adjusted by any suitable negative feedback system, such as, for example, one similar to that illustrated in FIG. 6, but suitably designed therefor.

While passing through holographic lens 25, laser beam 13 is diffracted according to the diffraction grating or pattern initially constructed therein during the making thereof. Hence, a portion of beam 13 - namely, diffracted light 29 - travels to a transulcent screen 31 physically located in front of the viewing lens of a microscope 33. Microscope 33 is adapted to be moved as necessary on a pedestal 35 for proper alignment with diffracted beam 29 (or beams 29, as the case may be), with the movement thereof preferably accomplished manually by a manual mover 30, but by any other means desired. Moreover, it contains internal sighting indicia, such as a reticle (not shown), which make it possible for a human or other observer to aim it on the bright spot which occurs on translucent screen 31 as a result of diffracted laser beam 29 impacting on one side thereof.

At this time, it would appear to be noteworthy that the aforesaid screen and microscope combination is, in actuality, a particular type of detector 35 which detects the aforementioned diffracted laser beam 29 at one or more (usually more) locations with respect to the spot within holographic lens 25 where the diffraction thereof occurs, which, of course, acts as a reference spot therefor. Therefore, it should be understood that such combination is disclosed without intended limitation, and, hence, that detector 35 may be anything that will receive and be responsive to the effective impact of diffracted laser or other energy beam 29 thereon. Thus, it may, for instance, be a camera containing film sensitive to laser beam 29, or it may be an array of suitably disposed photo-detectors, with the outputs thereof connected to a computer 37 which computes and reads out in suitable units the impact location of laser beam 29 thereon with respect to the aforementioned reference spot.

The non-diffracted portion of laser beam 13 passes on to and perhaps through a second mask 39, depending on whether it has been designed as a plate having a plurality of rows and columns of dots or holes, as partially represented by the mask of FIG. 5. Like mask 21 of FIG. 4, mask 39 of FIG. 5 will be discussed more fully below.

As will be explained more fully during the operation of the invention, laser light 13 is diffracted at some angle $\alpha$ or $\beta$ or both — the angles of which are determined by the diffraction grating of holographic lens 25 whose aberrations are being measured — with respect to the straight, continued, non-diffracted, projection thereof toward mask 39, the latter of which thus constitutes a reference laser light projection or line from which the distance of microscope 33 is measured in the X, Y and Z directions from where it passes through holographic lens 25.

In the event it is desired to automatically regulate the position of beam positioner 17 — and mirrors 15 and 19 — a plurality of vertical and horizontal photo diodes 41 are placed behind mask 39 in such manner that they will respectively receive whatever light that passes through the holes thereof.

For the purpose of maintaining the proper relative dispositions of all of the aforesaid elements, they are appropriately mounted on any suitable platform or bench 43. Thus, as best seen in FIG. 3, laser 11, beam positioner 17, mask 21, holographic lens 25, microscope 33, mask 39, and vertical and horizontal photo-diode arrays 41 are effectively connected to bench 43 by means of mounts 45, 47, 49, 51, 53, 56, and 58, respectively. Of course, when automatic control is incorporated in the invention, mount 47 is laterally movable and elevatable, and to permit the rotation of table 23, it is designed in such manner that movement thereof to some particular location may be manually effected.

Obviously, it would be well within the purview of one skilled in the art having the benefit of the teachings presented herewith to design all of the aforesaid respective mounts to be either fixed, movable, or rotatable as necessary to make the subject invention operate in an optimum manner, regardless of whether automatic or manual control is being used.

Because it is necessary that certain relative positions of all of the aforesaid elements be maintained if optimum accuracy of holographic lens aberration measurements is to be obtained, the following relative dimensions are presented at this time:

| Between Elements | Distance |
| --- | --- |
| 11 and 17 | 30 cm |
| 17 and 21 | 20 cm |
| 21 and 25 | 100 cm |
| 25 and 33 | 40 cm |
| 25 and 39 | 200 cm |
| 39 and 41 | 1 cm |

Of course, these dimensions are only representative and for some operational purposes and some holographic lenses, other dimensions may be designed into the invention by the artisan, if so doing would optimize it for a given operation or testing situation.

As previously indicated, the subject invention may optionally be operated in the automatic adjustment mode. For such purpose, a horizontal negative feedback control system 55 is connected between the horizontal photo-diodes of vertical and horizontal photo-diode arrays 41 and the input of a reversible motor 57, which, in turn, is mechanically connected to an X-axis lateral mover 59 that is physically connected to the aforesaid movable mirror 15, as seen in the embodiment of FIG. 1 only. Likewise, a vertical negative feedback control system 61 is connected between the outputs of the vertical photo-diodes of vertical and horizontal photo-diode arrays and the input to another reversible motor 63, the shaft output of which is connected to a Y-axis elevator 65 connected to and adapted for raising and lowering beam positioner 17 — and, hence, movable mirror 15.

From the foregoing, it may readily be seen that mirror 15 may be automatically moved in such manner as to cause the laser light reflected therefrom to be ultimately received by the centrally located photo-diode of vertical and horizontal photo-diode arrays 41 if the system of FIG. 1 is used and the same may be implemented manually if only the embodiments of FIGS. 2 and 3 are used.

As previously indicated, the mask of FIG. 4 is the type of mask typically employed as mask 21 in the devices of FIGS. 1 through 3. As may be seen therefrom, a plurality of holes 71 have been made therethrough. Said holes are preferably 1.6 mm in diameter, and the centers thereof are preferably spaced 1 cm apart, with the length and width dimensions of mask 21 being of the order of 20 cm. In FIG. 4, only three lines and rows of holes have been illustrated for the sake of simplicity of disclosure; however, it should be understood that any number thereof may be used, and that the entire mask may be filled with holes, if so desired.

Also, as previously indicated, the mask of FIG. 5 is the type of mask typically employed as mask 39 in the devices of FIGS. 1 through 3. Thus, as may be seen, a plurality of holes or dots 81 are located therein or thereon, as the case may be, depending on whether automatic or manual control is being used. In any event, said holes or dots are preferably 1.6 mm in diameter and the centers thereof are preferably spaced 1 cm apart, with the length and width dimensions of mask 39 being of the order of 20 cm. Again, like mask 21, mask 39 is shown as including only three lines and rows of holes or dots 81; nevertheless, it should be understood that any number thereof may be used, and that the entire mask may be filled therewith, if desired.

FIG. 6 depicts the negative feedback control system that may be incorporated in the instrument of FIG. 1 as both horizontal negative feedback control system 55 and vertical negative feedback control system 61. Furthermore, with mere design changes, it could be used to adjust the position of rotatable table 23 — and, thus, holographic lens 25 — provided, of course, that the proper sensors (such as properly designed photo-diodes, physical position sensors, or the like) are properly placed in combination therewith.

In this particular control system embodiment, the reversible motor acts as either reversible motor 57 or reversible motor 63, and photo-diodes 91, 93, and 95 constitute either three vertical photo-diodes or three horizontal photo-diodes included in vertical and horizontal photo-diode arrays 41. Only three of such diodes are shown herein, in order to keep this disclosure as simple as possible; however, it should be understood that any number thereof may be so used in either the vertical or horizontal configuration as desired, inasmuch as the selection thereof would only involve the making of design choices with respect thereto and the apparatus associated therewith, with said design choices being comparable to including additional structure and elements similar to those disclosed in the remainder of the system of FIG. 6.

As may readily be seen, the positive and negative outputs from photo-diode 93 — herein considered to be the center diode of array 41 — are respectively connected to an operational amplifier 97 and a ground 99, and the outputs of operational amplifier 97 are respectively connected to the grounded field center tap input of reversible motors 57 or 63 and the movable arm of a single throw double pole solenoid switch 101. The two pole contacts of switch 101 are respectively connected to the opposite ends of the field of reversible motors 57 or 63 in a conventional manner, thereby causing said motor to run in one direction if the movable arm of switch 101 is in contact with the upper pole contact and the other direction if it is in contact with the lower pole contact. Switch 101 should be designed to have said movable arm urged toward an upper pole contact closed condition when the solenoid thereof is de-energized and then drawn to a lower pole contact closed condition whenever the solenoid thereof is energized. A tension spring 103 may be used for such purpose, if desired. Of course, the rotation of reversible motors 57 or 63 must be connected and calibrated so that they will run in the right direction to move mirror 15 in such manner that the laser light reflected therefrom will travel in the correct direction and, thus, return to substantially the center of photo-diode 93.

Reference voltage 105 is connected between ground 99 and the other input of operational amplifier 97.

Photo-diodes 91 and 95 (and all of the other off-center photo-diodes, as the case may be) are connected between ground and the control input of a switch 107 comprising suitably chosen transistor 109. The cathode of transistor 109 is connected to the trigger input of a bistable multivibrator (flip-flop) 111, the output of which is connected to one of the terminals of the solenoid of the aforesaid solenoid switch 101, the other terminal of which is connected to ground 99.

A direct current (D.C.) voltage 113 — say, of the order of 2.5 volts — is connected between ground 99 and the cathode of switch transistor 107.

At this time, it would appear to be worthy of note that all of the elements of FIGS. 1 through 6 are well known and conventional; therefore, it is to be understood that it is their unique interconnections, interarrangements, and interactions that effects the subject invention and causes it to produce the above stated new and unique results.

MODE OF OPERATION

The operation of the invention will now be discussed briefly in conjunction with all of the figures of the drawing.

With the system constituting the invention set up physically as shown in FIGS. 2 and 3, laser beam 13 will be directed thereto and through holographic lens 25 as indicated. Such set up thus permits a human operator to obtain the location of two (or more) points on a single ray of light which has been diffracted at some angle α and/or β by holographic lens 25 with a high degree of accuracy by means of microscope 33 and the known position thereof. Once said two points have been determined, slope angle α and/or β may be calculated by suitable and conventional mathematical procedures. Microscope 33 is then moved in such manner and the aforementioned process is repeated until the slopes (α and β angles) of several laser light rays are obtained from several locations of laser beam 13 across the holographic lens aperture. Such measured slopes are related to the aberrations of holographic lens 25 and, accordingly, may be plotted in graphical form near the focal spot thereof. This graphical plot and several others similar thereto but made at different angles, lateral positions, and laser light wavelengths provides a reasonable visible representation of the caustic of holographic lens 25 — that is, that bundle of light that comes out of holographic lens 25 and travels toward, through, and beyond the focal point thereof. This caustic may then be analyzed for its cusp, girth, longitudinal displacement from other caustic cusps, and lateral location to obtain an indication of the total aberrations of the lens.

The procedure for implementing the above is outlined as follows:

1. A laser light ray of known wavelength is passed through a hole in mask 21 and adjusted — either manually or automatically — until it is aligned with the corresponding spot or hole — as the case may be — in mask 39. So doing provides a reference line from which the aforesaid α and β angles may be measured and calculated. Said light ray impinges on holographic lens 25 and is diffracted at some angle α and/or β with respect to the aforesaid reference light ray. Holographic lens 25 is then rotated about its vertical axis until the amount of diffracted light is maximum, i.e., it is placed at the angle for which it was designed to be used.

2. With translucent screen 31 in place in front of microscope 33, microscope 33 is moved laterally across base 37 until it intercepts diffracted light ray 29 and has the light ray centered as a bright spot on said screen and sighted on the reticle thereof. Then the X, Y, Z position of said light ray spot on screen 31 is recorded with respect to that point on holographic lens 25 which constitutes the center thereof. Microscope 33 is then moved to another position that is nearer holographic lens 25, and again the X, Y, Z position of the light ray spot on screen 31 is recorded.

3. The above mentioned X, Y, Z positions are then used to calculate the slope angles α and/or β of each of the aforesaid diffracted light rays, after which they are plotted graphically or mathematically analyzed, as previously suggested.

4. Laser beam 13 is moved — either by moving laser 11 or beam positioner 17 — to another hole (and so on) in mask 21 and the corresponding dot or hole in mask 39 and the above procedure is repeated.

5. Then the wavelength of the laser light is changed, and the above procedure is repeated.

By using the aforesaid apparatus and procedures constituting the instant invention, various and sundry aberrations may be discovered and measured and/or subsequently calculated to the extent that it can be decided whether or not the holographic lens being tested is adequate for its intended use. Such aberrations, for instance, are as follows:

1. Spherical aberration, which is herein defined as the blurring that occurs in the on-axis focal spot of a holographic lens because all of the rays in any one direction across the entire lens aperture are not diffracted to exactly the same point in space. Furthermore, to some degree, the girth of the cusp of the caustic at said spot is an indication of the spherical aberration of the lens.

2. Coma, which is an aberration herein defined as the blurring that occurs in an off-axis focal spot of a holographic lens because all of the rays in any one direction across the entire lens are not diffracted to exactly the same point in space. Moreover, to some degree, the girth of the cusp of the caustic at said off-axis spot is an indication of the coma of the lens.

3. Astigmatism, which is an aberration herein defined as being the property of a holographic lens which causes a point object to be imaged into a line segment. This property exists when the laser light rays in a first axis across the entire aperture of a holographic lens are diffracted to a first position in space which is longitudinally displaced from a second position in space where laser light rays in a second axis, which is normal to said first axis, across the entire aperture of the holographic lens are diffracted. To some degree, the displacement of said second position in space from said first position in space is indicative of the astigmatism existing in the holographic lens.

4. Field curvature, which is herein defined as being that property of a holographic lens which causes the laser light rays impinging on the central axis of the aperture thereof at different angles to be diffracted to focal spots that are nearly equidistant from the center of the aperture of the lens but at varying angles. The locus of such focal spots appears as an arc in space which, in turn, causes the focal surface or field of the holographic lens to be curved. To some degree, a plot of the locus of focal spots resulting from a series of sets of rays being diffracted by the holographic lens at various predetermined angles yields an indication of the field curvature of the lens.

5. Distortion is herewith defined as being that property of a holographic lens which causes object points at varying distances from the central optical axis thereof to receive varying magnifications. When such magnifications decrease as the edge of the image field is approached, the aberration is called pincushion distortion. To some extent, a plot of the diffracted image points of a regular array of object points indicates the distortion of the holographic lens being measured.

6. Chromatic aberration is herewith defined as being that property of a holographic lens which causes light of varying wavelengths to be diffracted to focal spots that do not coincide. To some degree, the displacement between such focal spots is an indication of chromatic aberration.

Whether or not automatic positioning of beam positioner 17 — and, hence, laser light 13 — is employed is optional. Hence, use of the system of FIG. 6 in conjunction with the system of FIG. 1 may be considered as being optional, too. Nevertheless, because the incorporation thereof therein may be advantageous under certain circumstances, the operation of the negative feedback control system of FIG. 6 will be discussed.

The operation of the negative feedback control system is very simple. Briefly, when that portion of laser beam 13 passing, for example, through the center hole of mask 39 of FIG. 1 shines on center photo-diode 93, its output voltage equals reference voltage 105 — because reference voltage 105 is calibrated and set that way - and, thus, there is no voltage differential at the inputs of operational amplifier 97. Consequently, operational amplifier 97 produces no voltage at the output thereof and, hence, reversible motor 57 or 63 will not run in any direction, even though the movable arm of switch 101 is in contact with the upper normally closed contact thereof (as a result of being so urged by spring 103 or any other conventional urging means, whether internal or external of said solenoid switch 103). In other words, because no electrical power is being supplied to the reversible motor at such time, it will not run. And, in turn, because mirror 15 is effectively connected thereto, it will not be moved either. Thus, laser beam 13 continues to shine on photo diode 93, the position it should be in, in order to properly pass through and, in this particular instance, be centered on the aperture of holographic lens 25, the lens whose aberrations are being measured.

On the other hand, in the event laser beam 13 shines on photo diode 91 because mirror 15 is improperly placed for some reason or another, it produces an output signal which causes transistor 109 to conduct, thereby effectively closing switch 107, so as to supply an actuating signal to the trigger input of bistable multivibrator 111. Of course, bistable multivibrator 111 is designed to change state with each trigger input signal; hence, the state thereof is alternated by consecutive trigger signals being supplied thereto.

In this instance, bistable multivibrator 111 should be set so that it changes from a "0" state to a "1" state which, in turn, supplies a positive voltage to the solenoid of switch 101, thereby energizing it and causing the movable arm of switch 101 to be moved into contact with the lower electrical contact thereof. When said movable arm touches said lower contact, motor 57 and 63 runs in such direction as to move mirror 15 effectively connected thereto in such manner that the laser beam reflected therefrom is directed toward center photo diode 93, upon which it then becomes centered. At such time, no output signal is produced by photo diode 91, switch 107 opens, operational amplifier 97 produces no output signal, and motor 57 or 63 stops running.

In the event laser beam 13, for some reason or another, shines on photo diode 95, a similar procedure occurs, causing bistable multivibrator 111 to change to a "0" state, de-energizing the solenoid of switch 101, permitting the movable arm to return to touch the upper electrical contact, and reversing motor 57 or 63. Such motor reversing, of course, causes mirror 15 to direct laser beam 13 back toward photo diode 93, where it is ultimately centered thereon, and after which it stops.

Consequently, as may readily be seen, when used as horizontal and vertical negative feedback control systems 55 and 61 in the system of FIG. 1, the control system of FIG. 6 facilitates adjusting the position of laser beam 13 automatically and in an optimum manner, so that it will shine through the center hole of mask 39.

Although only control with respect to, say, the center hole of mask 39 has been explained above, it should be obvious to the artisan that moving photo diode array 43 properly could cause laser beam 13 to be automatically projected through any other hole thereof.

From the foregoing, it may readily be seen that the instant invention constitutes a new and unique method and means for taking measurements from a holographic lens which may be used, either directly or indirectly, to ascertain to some extent the various and sundry aberrations inherently existing therein.

Obviously, many modifications and variations of the present invention are possible in the light of the above teachings. It is therefore to be understood that within the scope of the appended claims, the invention may be practiced otherwise than as specifically described.

What is claimed is:

1. An apparatus for measuring parameters that are analogous to aberrations in an energy diffraction means, comprising in combination:
    means for generating and projecting a predetermined energy having a predetermined wavelength;
    first mask means spatially disposed from said predetermined energy generating and projecting means and in the path of the energy projected thereby for masking predetermined portions thereof in accordance with a first masking pattern;
    rotatable means spatially disposed from said first masking means for mounting an energy diffraction means in the path of the energy passed therethrough in such manner that a portion of the energy received by said energy diffraction means will be diffracted in accordance with the diffraction grating thereof;
    second mask means spatially disposed from said rotatable energy diffraction means mounting means and in the path of the energy not diffracted by said energy diffraction means for the aligning thereof in accordance with a second masking pattern;
    semi-clear screen means movably and spatially disposed from the aforesaid mounting means in such manner that the diffracted energy from said energy diffraction means will obliquely impact on one side thereof and partially pass therethrough;
    detector means contiguously disposed with the other side of said semi-clear screen means in such manner as to be responsive to and centered upon that portion of said diffracted energy which passes therethrough; and
    means effectively positioned with respect to the location where said energy passes through the aforesaid energy diffraction means and the location on said screen where said energy obliquely impacts thereon for indicating the X, Y, Z axes distances therebetween, respectively.

2. The invention of claim 1, wherein:
    the distance between said predetermined energy generating and projecting means and the aforesaid first masking means is ten centimeters;
    the distance between said first masking means and the center of the aforesaid rotatable energy diffraction means mounting means is one hundred centimeters;
    the distance between the center of the aforesaid rotatable energy diffraction means mounting means and the aforesaid second masking means is two hundred centimeters; and
    the distance between the center of said rotatable energy diffraction means mounting means and the center of the aforesaid semi-clear screen means is variable.

3. The device of claim 1, wherein said means for generating and projecting a predetermined energy having a predetermined wavelength comprises a laser.

4. The device of claim 1, wherein said first means spatially disposed from said predetermined energy generating and projecting means and in the path of the energy projected thereby for masking predetermined portions thereof in accordance with a first masking pattern comprises a plate having a plurality of holes therethrough, with said holes being spatially disposed a predetermined distance from ones adjacent thereto, respectively.

5. The device of claim 1, wherein said rotatable means spatially disposed from said first masking means for mounting an energy diffraction means in the path of the energy passed therethrough in such manner that the energy received by said energy diffraction means will be diffracted in accordance with the diffraction grating thereof comprises:
   a base adapted for being positioned on a platform; and
   an extension member for fixidly holding a holographic lens being tested at a predetermined height in space with respect to said base.

6. The device of claim 1, wherein said second mask means spatially disposed from said rotatable energy diffraction means mounting means and in the path of the energy not diffracted by said energy diffraction means for the aligning thereof in accordance with a second masking pattern comprises a plate having a plurality of holes therethrough, with said holes being spatially disposed a predetermined distance from ones adjacent thereto, respectively.

7. The device of claim 1, wherein said second mask means spatially disposed from said rotatable energy diffraction means mounting means and in the path of the energy not diffracted by said energy diffraction means for the aligning thereof in accordance with a second masking pattern comprises a plate having a plurality of dots marked on one side thereof, with said dots being spatially disposed a predetermined distance from ones adjacent thereto, respectively.

8. The device of claim 1, wherein said semi-clear screen means movable and spatially disposed from the aforesaid mounting means in such manner that the diffracted energy from said energy diffraction means will obliquely impact on one side thereof and partially pass therethrough comprises a translucent screen.

9. The device of claim 1, wherein said detector means contiguously disposed with the other side of said semi-clear screen means in such manner as to be responsive to and centered upon that portion of said diffracted energy which passes therethrough comprises a microscope.

10. The devices of claim 1, wherein said means effectively positioned with respect to the location where said energy passes through the aforesaid energy diffraction means and the location on said screen where said energy obliquely impacts thereon for indicating the X, Y, Z axes distances therebetween comprises a trio of scales having indices in millimeters and fractions thereof.

11. The invention of claim 1, further characterized by means effectively connected to each of the aforesaid means for effecting the holding thereof in predetermined relative positions, respectively.

12. The invention of claim 1, further characterized by movable means spatially disposed between said predetermined energy generating and projecting means and the aforesaid first masking means for receiving the energy projected by said predetermined energy generating and projecting means and effecting the redirecting thereof toward a predetermined location on one side of said first masking means.

13. The device of claim 12, wherein said energy receiving and redirecting effecting means comprises a mirror.

14. The device of claim 12, wherein said energy receiving and redirecting effecting means comprises a periscopic means including:
   a first mirror for receiving said energy from said predetermined energy generating and projecting means and for reflecting it along a predetermined path;
   a second mirror spatially disposed from said first mirror for receiving the energy reflected therefrom and for reflecting it toward said predetermined location on one side of said first masking means.

15. The device of claim 12, wherein said energy receiving and redirecting effecting means comprises a plurality of spatially disposed optically associated mirrors.

16. The invention of claim 12, further characterized by:
   vertical and horizontal photo diode arrays contiguously disposed with the side of said second mask means that is opposite said rotatable mounting means for response to energy passing therethrough; and
   vertical and horizontal negative feedback control means effectively connected between the outputs of said vertical and horizontal photo diode arrays and the aforesaid energy redirecting means for positioning said projected predetermined energy at a given location on said second mask means.

17. An apparatus for measuring parameters that are analogous to aberrations in an energy diffraction means, comprising in combination:
   means for generating and projecting a predetermined energy having a predetermined wavelength;
   first mask means spatially disposed from said predetermined energy generating and projecting means and in the path of the energy projected thereby for masking predetermined portions thereof in accordance with a first masking pattern;
   rotatable means spatially disposed from said first masking means for mounting an energy diffraction means in the path of the energy passed therethrough in such manner that a portion of the energy received by said energy diffraction means will be diffracted in accordance with the diffraction grating thereof;
   second mask means spatially disposed from said rotatable energy diffraction means mounting means and in the path of the energy not diffracted by said energy diffraction means for the aligning thereof in accordance with a second masking pattern;
   detector means spatially disposed from said mounting means and along a line coinciding with a predetermined diffraction path of the aforesaid energy diffraction means for response to a given portion of the energy diffracted thereby; and
   means effectively positioned with respect to the location where said energy passes through the aforesaid energy diffraction means and the center of said detector means for indicating the X, Y, Z axes distances therebetween, respectively.

18. The device of claim 17, wherein said detector means comprises a camera.

19. The device of claim 17, wherein said detector means comprises a photo diode array.

20. The device of claim 19, further characterized by a computer connected to the outputs of each of the photo diodes of the aforesaid photo diode array.

* * * * *